United States Patent [19]

Utsumi

[11] Patent Number: 4,631,396
[45] Date of Patent: Dec. 23, 1986

[54] FOCUS ERROR DETECTION DEVICE

[75] Inventor: Yoshihiro Utsumi, Tokorozawa, Japan

[73] Assignee: Pioneer Electronic Corporation, Tokyo, Japan

[21] Appl. No.: 504,800

[22] Filed: Jun. 16, 1983

[30] Foreign Application Priority Data

Jun. 17, 1982 [JP] Japan .................. 57-090828[U]

[51] Int. Cl.$^4$ .............................. G01J 1/20
[52] U.S. Cl. ........................ 250/201; 369/45
[58] Field of Search ............... 250/201; 369/44, 45, 369/46

[56] References Cited

U.S. PATENT DOCUMENTS

| | | | |
|---|---|---|---|
| 4,025,949 | 5/1977 | Whitman | 250/201 |
| 4,280,215 | 7/1981 | Okano | 369/45 |

Primary Examiner—Davis L. Willis
Assistant Examiner—James G. Gatto
Attorney, Agent, or Firm—Fleit, Jacobson, Cohn & Price

[57] ABSTRACT

A focus error detection device for use with a system for optically recording and reading out information, and which can produce a symmetrical focus error signal with respect to the amount of displacement of the reflecting surface of the recording medium from an in-focus position. A second cylindrical lens whose axial direction is perpendicular to the axial direction of a first cylindrical lens is provided, and lateral magnification between the position of the receiving surface of a photo detector and a conjugate plane, which is located adjacent to the in-focus position of the reflecting surface, is made uniform in each direction. By this feature, the output signal of the photo detector varies in a symmetric manner in both directions from the in-focus position of the reflection surface.

3 Claims, 16 Drawing Figures

FOCUS ERROR DETECTION DEVICE

BACKGROUND OF THE INVENTION

1. Field of the Invention

The present invention relates to a focus error detection device, and more specifically to a focus error detection device which is to be used in an optical system for recording and reading out information.

2. Description of Background Information

In a system optically recording and reading out information, such as video disc player or a digital audio disc player, it is common to provide a focus error detection device for automatically adjusting the position of an object lens which is provided for applying a light beam from a light source onto a recording surface of a recording medium. The focus error detection device generally consists of a photo detector for detecting the intensity of light reflected by the recording surface and for producing a signal indicative of an amount and direction of the focus error, and a beam splitter for directing the light reflected by the recording surface to the photo detector. In order to detect the focus error, a cylindrical lens is provided between the beam splitter and the photo detector so that an in-focus position is determined by means of astigmatism of a cylindrical mirror.

However, in the cases of conventional arrangements, there was inevitably a difficulty in that the lateral magnification between a reflecting surface of the recording surface and a receiving surface of the photo detector varies, depending on the direction. Due to the lack of uniformity of the lateral magnification, the output signal of the photo detector becomes asymmetric with respect to the direction of displacement of the object lens from the in-focus position, which has adversely affected the stability of the focus servo system, especially during the lock-in period of the focus servo system. Further, a spurious in-focus position, at which the output signal of the photo detector has a level equal to the level indicative of the in-focus position, has been generated due to the difference of the values of the lateral magnification in different directions.

SUMMARY OF THE INVENTION

An object of the present invention is therefore to provide a focus error detection device in which the lateral magnification is made uniform in every direction, and which can produce a focus error signal having a level characteristic which is symmetrical with respect to the direction of the displacement of the object lens from the in-focus position.

Another object of the present invention is to provide a focus error detection device in which the adjustment of the optical axes is simplified.

According to the present invention, a focus error detection device for use with a system for recording and reading out information, the system having a source of light and an optical path for leading a light beam from the source of light onto a recording surface of a recording medium, comprises:

a beam splitter disposed in the optical path between the source of light and the recording surface of the recording medium, for directing light reflected by the recording surface into a position for detection;

a photo detector for receiving the light from the beam splitter and generating an output signal to be used for production of a focus error signal;

a first uniaxial lens disposed between the beam splitter and the photo detector; and a second uniaxial lens disposed between the beam splitter and the photo detector and having an axial direction which is substantially perpendicular to the axial direction of the first uniaxial lens, wherein the arrangement of the optical elements including the first and second uniaxial lenses is so determined that lateral magnification in a plane perpendicular to an axis of the first uniaxial lens is equal to lateral magnification in a plane perpendicular to an axis of the second uniaxial lens.

According to another aspect of the invention, the first and second uniaxial lenses are combined.

According to further aspect of the invention, the first and second uniaxial lenses are disposed in a manner that the axial directions thereof are substantially inclined to the direction of an image of a recording track of the recording medium by an angle of 45°.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF THE PREFERRED EMBODIMENTS

Figure 1:
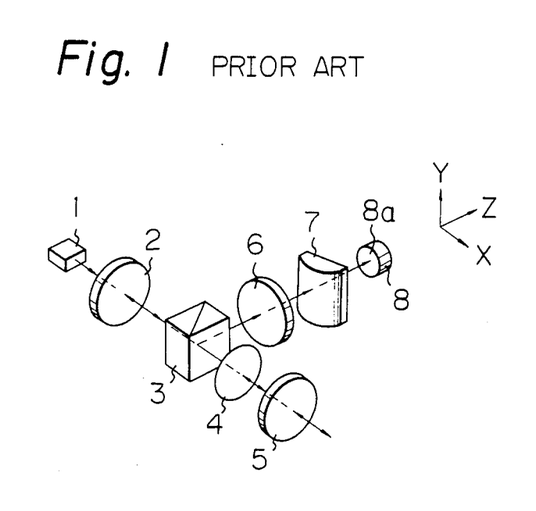
FIG. 1 is a perspective view of an example of the conventional arrangement of the focus error detection device.

Before entering into the explanation of the present invention, reference is first made to FIG. 1 in which an arrangement of a conventional focus error detection device is illustrated. As shown, the device is associated with an optical system for reading out recorded information which includes a source of light 1, such as a semiconductor laser element. The light emitted from the light source 1 then passes into a beam splitter 3 via a collimating lens 2. The light which has passed through the beam splitter 3 is directed to a quarter wave plate 4 and an object lens 5, by which the light beam is focused on a recording surface of an information recording medium. On the other hand, the light beam reflected by the recording surface passes through the same path of the optical system as the read out system and is received by the object lens 5 and directed to the beam splitter 3 via the quarter wave plate 4. At the beam splitter 3, the reflected light beam from the recording surface is then directed to a spherical lens 6 of an optical system of the focus error detection device. The reflected light beam is then received by a photo detector 8 after passing through a cylindrical lens 7, which imparts astigmatism. In other words, the cylindrical lens 7 has a pair of line foci (a vertical line focus and a horizontal line focus), the directions of which are perpendicular to each other and the focal length of the vertical focus is shorter than the focal length of the horizontal focus. Further, there is a position between the line foci at which the cross section of the astigmatic beam of light from the cylindrical lens 7 becomes circular. The position of the photo detector 8 is so determined that the receiving surface 8a thereof is in that position between the line foci. A focus error signal is then generated in response to the magnitude of the output signal of the photo detector 8.

Figure 2:
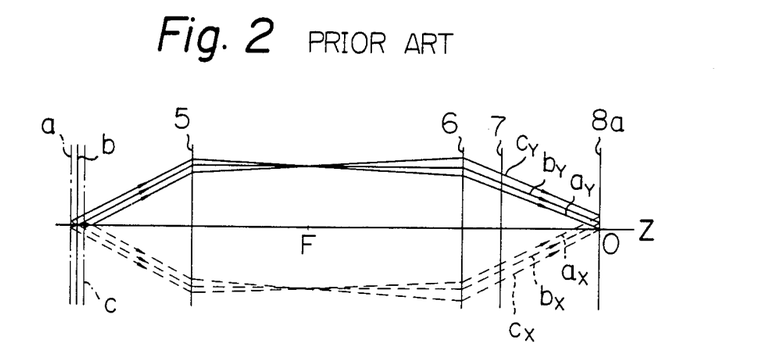
FIG. 2 is a diagram showing the edges of light beams reflected from a reflecting surface at various reflecting surface positions, and which pass through the optical system of the focus error detection device shown in FIG. 1.
Figure 3:
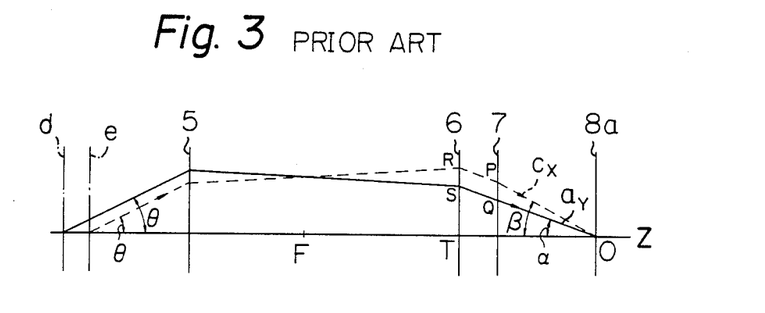
FIG. 3 is a diagram similar to FIG. 2 especially showing lateral magnification of each direction between the receiving surface of the photo detector and the conjugate planes thereof on the side of the reflecting surface.

FIG. 2 shows the edges of the reflected light beams from various positions a, b, c, respectively, of the reflecting surface, which moves along the optical path from the reflecting surface to the photo detector 8, that is, from the recording surface of the recording medium. Throughout the figures, the solid lines indicates a Y-Z component of the reflection beam and the broken lines show an X-Z component of the reflection beam. As shown, in the case of the reflection beam from the position a, which is farther than the focal plane of the object lens 5, the Y-Z component $a_Y$ of the reflected light beam (X, Y and Z being the directions shown in FIG. 1) converges at a point on the photo receiving surface 8a. In the case of the reflection beam from a position b, which is substantially on the focal plane of the object lens 5, the reflection beam converges in a circular form at the receiving surface 8a (the diameters of the beams along the X axis and the Y axis are equal to each other on the receiving surface 8a). In the case of the reflection beam from a position c, which is closer than the focal plane of the object lens 5, the X-Z component $c_X$ converges at a point on the receiving surface 8a. In order to clarify the problem, only the components $a_Y$ and $c_X$ among various edges of reflected light in FIG. 2 are illustrated in FIG. 3. By means of light beams $a_Y$ and $c_X$ shown in FIG. 3, lateral magnification between the receiving surface 8a and conjugate planes d and e thereof are given directly. Specifically, the lateral magnification $m_X$ for the Y-Z plane and the lateral magnification $m_Y$ for the X-Z plane are obtained by the ratio between the angle of the edge of the beam at the reflecting surface and the angle of the edge of the beam at the receiving surface, which are expressed as follows:

$$m_X = \theta/\alpha \quad m_Y = \theta/\alpha$$

As it will be seen from FIG. 3, the positions P and Q at which the edge of the X-Z component and the edge of the Y-Z component of the reflection beam pass the cylindrical lens 7 are representative of the lateral magnifications $m_X$ and $m_Y$, respectively. Therefore, the values of the lateral magnification are different from each other, which causes the asymmetric variation of the focus error signal with respect to the distance from the focal plane.

Further, it is conceivable to move the point P to the position of point Q by using a concave cylindrical lens as the cylindrical lens 7. However, the use of a concave cylindrical lens is not possible since, in that case, an extension of the line RP (RQ) must cross the light axis at a position closer than the position O, and such is inconsistent with the path of the edge of the beam $c_X$. In other words, the diameter (ST) of the edge of the component $a_Y$ of the reflection beam which is diverging into the lens 6 must be greater than the diameter (RT) of the edge of the component $c_X$ of the reflection beam which is diverging into the lens 6, or converging into the lens 6 at a converging angle smaller than that of the component $a_Y$. However, such a condition is satisfied only at a position within the focal length of the object lens 5 and it is generally impossible to arrange various optical elements such as the lens and the beam splitter within the range of the focal length of the lens 5, which is usually rather short. Further, even though it is possible to provide a conjugate plane which satisfies the above condition by using a relay lens, such an arrangement is not advantageous since the length of the optical passage would be enlarged, and that would complicate the structure of the device.

Figure 4A:
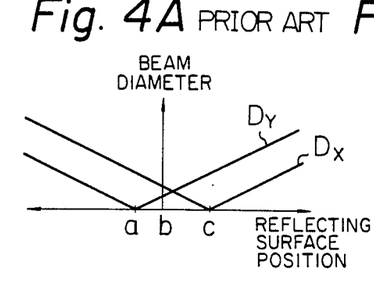
FIGS. 4A to 4C are diagrams respectively showing the variation of the diameters of the light beams $D_X$, $D_Y$ at the conjugate planes, the diameters of the light beams in each direction of the receiving surface of the photo detector, and the variation of the focus error signal, with respect to different positions of the reflecting surface.
Figure 4B:
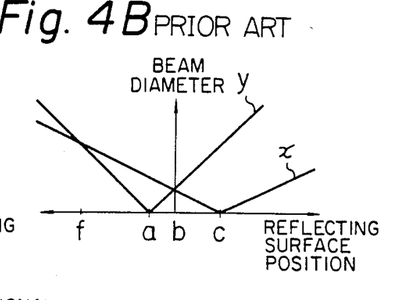
Figure 4C:
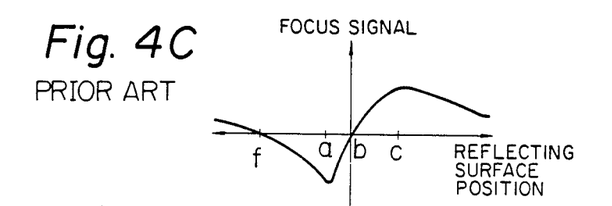

Turning to FIGS. 4A to 4C, the relationship between the variation of the diameter of the light beam and the magnitude of the focus error signal will be further explained hereinafter.

As shown in FIG. 4A, which shows the diameter of the light beam at the reflecting surface, since the lateral magnification $m_X$ differs from the lateral magnification $m_Y$, the diameter $D_Y$ of the light beam in the Y-Z plane which converges on the receiving surface of the photo detector, and the diameter $D_X$ of the light beam in the X-Z plane which converges on the receiving surface of the photo detector, are not equal to each other at the in-focus position b of the reflecting surface. The different diameters $D_X$ and $D_Y$ are then multiplied by the $m_X$ and $m_Y$, respectively, in the optical path between the reflecting surface and the receiving surface, and the diameters x and y at the receiving surface as shown in FIG. 4B. By this arrangement, the output level of the photo detector varies as shown in FIG. 4C. As shown, besides the in-focus position b, there is another position f in which the output signal level of the photo detector is equal to 0 (zero). In other words, there are two positions at which the polarity of the output signal of the photo detector changes. As mentioned before, if the focus servo loop is closed at the position f, the object lens will be driven in a direction inverse to the proper direction, which causes a serious problem in the operation of the focus servo device.

Figure 5:
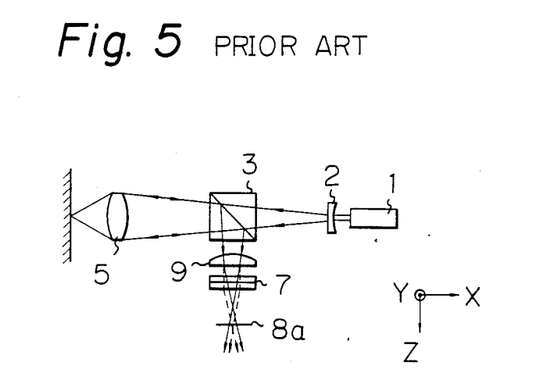
FIG. 5 is a schematic view of a second example of the arrangement of a conventional focus error detection device.

In FIG. 5, there is illustrated another example of a conventional arrangement of the focus error detection device. This arrangement features the use of another cylindrical lens 9 the axial direction of which is perpendicular to the axial direction of the cylindrical lens 7. The cylindrical lens 9 is provided for the purpose of equalizing the converging angles of reflected light beams, after passing through the cylindrical lenses 7 and 9, in a pair of planes including the axis of the optical path and which are perpendicular to each other.

Figure 6:
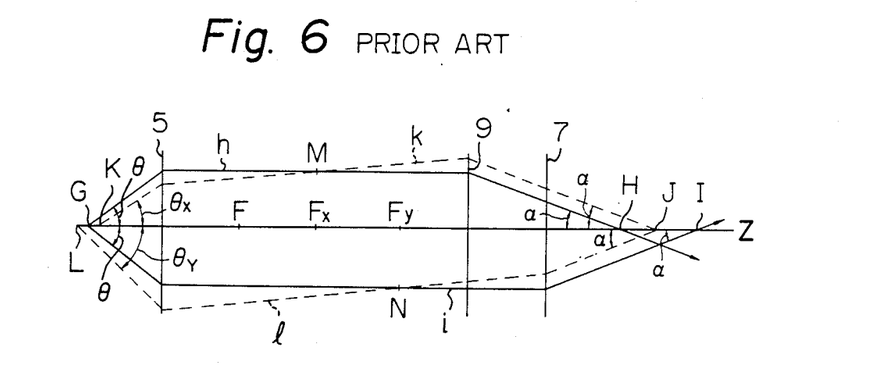
FIG. 6 is a diagram showing the paths of light beams passing through the optical system of the device of FIG. 5.

In FIG. 6, light beams passing through this optical system are illustrated. The solid lines h and i indicate edges of the reflected light beam from the in-focus position G, respectively in the X-Z plane and in the Y-Z plane. Two points H and I at which the edges h and i respectively converge, are conjugate points of the in-focus position G, and therefore lateral magnifications $m'_x$ and $m'_y$ are given as follows: $m'_x=\theta/\alpha$, $m'_y=\theta/\alpha$. This means the lateral magnification $m'_x$ is equal to the lateral magnification $m'_y$. also, longitudinal magnifications $m'_x{}^2$ and $m'_y{}^2$ become equal to each other. Since the shape of the light beam at the receiving surface 8a of the photo detector must be a true circle, the receiving surface 8a is positioned at a point J which is the middle point of the points H and I (HJ=JI). However, the above condition of uniform lateral magnification is not satisfied when the object lens is displaced from the in-focus position. As an example, light beams k and l which converge at the point J will be discussed. The light beam k, in the X-Z plane, crosses the light beam h at a position M, which is in the plane including the focal point Fx of the object lens 5, and it diverges from a point K at an angle of $\theta x$. Similarly, the light beam 1, in the Y-Z plane, crosses the light beam i at a position N, which is in the plane including the focal point Fy of the cylindrical lens 9, and it diverges from a point L at an angle of $\theta y$. Since there is a relationship among the angles $\theta x<\theta<\theta y$, lateral magnifications which are respectively expressed as $m_x=\theta x/\alpha$ and $m_y=\theta y/\alpha$ differ from each other. Also, the longitudinal magnifications $m_x{}^2$ and $m_y{}^2$ differ from each other. Due to the relative movement between the reflecting surface and the object lens, the edge of the light beam is displaced between the solid line and the broken line in FIG. 6, and the focus error signal from the photo detector will have a peak when the reflecting surface is positioned at the middle of the points G and K. Also, the focus error signal has another peak when the reflecting surface is positioned between the points G and L. However, since the longitudinal magnifications $m_x{}^2$ and $m_y{}^2$, which vary between $m'_x{}^2$ and $m_x{}^2$, $m'_y{}^2$ and $m_y{}^2$ respectively, are not equal to each other except at the in-focus position, and the displacements of the reflection plane which give the peaks of the focus error signal are not equal to each other (LG=KG). Therefore, the shape of the focus error signal becomes asymmetric with respect to the direction from the in-focus position G. In addition, due to the lack of uniformity of lateral magnification (it changes depending on the direction around the axis of the optical path), there will be a position other than the in-focus position at which the polarity of the focus error signal changes. In addition, in the case of the arrangement shown in FIG. 5, it is possible to obtain a symmetrical focus error signal, however, such a condition is limited to a case in which the above mentioned positions M and N are located on each side of the focal point F and satisfy a special arrangement relationship. Thus, in the case of conventional arrangements of the focus error detection device, it was not practically possible to obtain a focus error signal which is symmetrical with respect to the relative displacement between the object lens and the reflecting surface of the recording medium.

Referring to FIGS. 7 to 12, an embodiment of a focus error detection device according to the present invention will be explained hereinafter.

Figure 7:
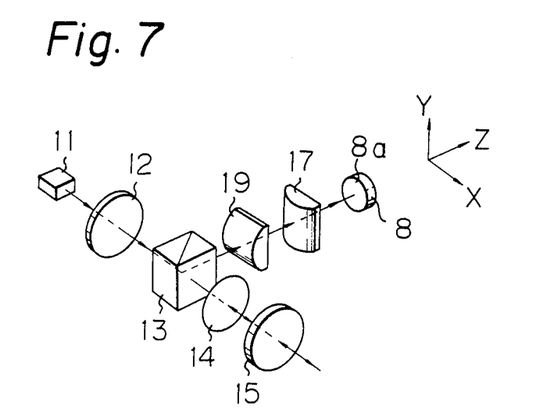
FIG. 7 is a schematic diagram showing the arrangement of a focus error detection device according to the present invention.
Figure 8:
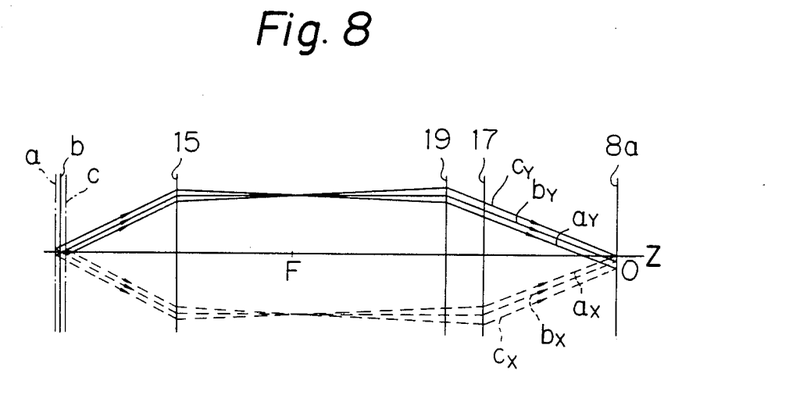
FIG. 8 is a diagram showing the beams of light which pass through the optical system of the focus error detection device of FIG. 7.

As shown in FIG. 7, the focus error detection device is associated with a system for recording and reading out information which has a light source 11, such as a semiconductor laser element. The light beam emitted by the light source 11 is directed to a beam splitter 13 via a collimating lens 12. After passing through the beam splitter 13, the light beam is applied to an object lens 15 via a quarter wave plate 14. By means of the objective leans 15, the light beam is focused on a recording surface (i.e., a reflecting surface) of a recording medium (not shown). A reflected light beam from the reflecting surface of the recording medium is then directed to the objective lens 15 and passes through the same optical path described above until it reaches the beam splitter 13. At the beam splitter 13, the reflected light beam is directed along the optical path of the focus error detection device. The focus error detection device comprises a first cylindrical lens 17 as a uniaxial lens, which directs the reflected light beam to a photo detector 8 having a receiving surface 8a. Between the first cylindrical lens 17 and the beam splitter 13 and a second cylindrical lens 19 is provided, instead of the spherical lens which has been used in the conventional arrangement. The axes of the cylindrical lenses 17 and 19 are perpendicular to each other and the axis of the second cylindrical lens 19 is set to be parallel to the optical path between the light source 11 and the objective lens 15. Furthermore, the curvature of the cylindrical lenses 17 and 19 and the relative positions thereof in the optical path are so determined that the lateral magnification between the receiving surface of the photo detector, and a conjugate plane thereof on the side of the reflecting surface, is the same in both of a pair of mutually perpendicular planes including the axis of the optical path. In FIG. 8, the edges of reflected light beams from the reflecting surface at various positions a, b and c are illustrated. As shown by the solid line ay, a beam of light reflected from a point on the reflecting surface, which is at a position a, converges in the Y-Z plane on a receiving surface 8a of the photo detector. Similarly, a beam of light reflected from a point on the reflecting surface which is at a position c converges in the X-Z plane on the receiving surface 8a, as shown by the solid line cx. In addition, the edge of a light beam reflected by the reflecting surface which is at an in-focus position b between the positions a and c arrives at the receiving surface 8a at a slight distance away from the center of the receiving surface 8a, as shown by the lines b$_X$ and b$_Y$ (which means the image is in the form of a small circle).

Figure 9:
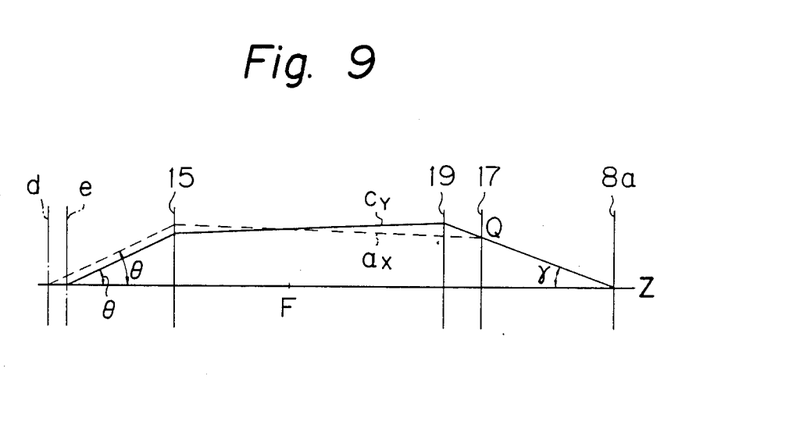
FIG. 9 is a diagram similar to FIG. 8, especially showing the lateral magnification between the receiv

In order to calculate the lateral magnifications in the Y-Z plane and in the X-Z plane, only the edges of the beams of light a$_Y$ and c$_X$, which are respectively in the Y-Z plane and in X-Z plane, are commonly illustrated in FIG. 9. As shown, the beam of light a$_X$ can be considered to be reflected at a conjugate plane d (for the X-Z plane) of the receiving surface 8a. Also, the pencil of light C$_Y$ can be considered to be reflected at a conjugate plane e (for the Y-Z plane) of the receiving surface 8a. As clearly shown in FIG. 9, the edges of the beams of light pass the same path between the point Q on the cylindrical lens 17 and the point O on the receiving surface 8a. This means that there is a common angle of incidence γ. Therefore, the lateral magnification of this arrangement has the same value for each direction (the plane Y-Z and the plane X-Z).

Further, in the depicted arrangement, the focal lengths of the objective lens 15, the cylindrical lens 17, and the cylindrical lens 19 are selected to be 30 mm, 38.75 mm, and 40 mm, respectively. In addition, the distance between the objective lens 15 and the cylindrical lens 19 and the distance between the cylindrical lens 19 and the cylindrical lens 17 are determined to be 70 mm and 10 mm, respectively. In addition, though the focal point of the objective lens 15 and the focal point of the second cylindrical lens 19 are at the same position in FIG. 9, it is not limited to this arrangement.

Figure 10:
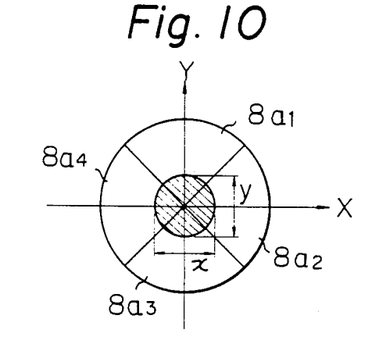
- FIG. 10 is a diagram showing the shape of the light beam on the receiving surface of the photo detector, when the reflection surface is in the in-focus position.

In FIG. 10, the form of the photo detector 8 is illustrated. As shown, the photo detector has four segments 8a$_1$ through 8a$_4$, which respectively detect the intensity of light applied thereto. The output electrical signals from a pair of segments 8a$_1$ and 8a$_3$, 8a$_2$ and 8a$_4$, which are diagonally arranged, are combined and the difference of the combined values is produced as a focus error signal Sf. Therefore, the focus error signal Sf is expressed as Sf=(Sa$_1$=Sa$_3$)−(Sa$_2$+Sa$_4$), where Sa$_1$ through Sa$_4$, respectively, indicate the output signal level of each segment. As shown by the shaded portion of FIG. 10, for the light beam reflected from the reflecting surface at the in-focus position, the diameters x and y of the light beam on the receiving surface in the directions of the X axis and the Y axis are equalized by suitably adjusting the position of the receiving surface 8a.

Figure 11:
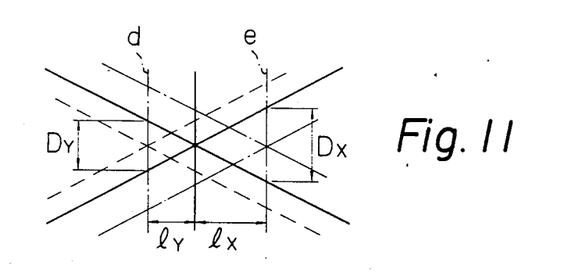
FIG. 11 is a diagram showing equivalent beams of light in the vicinity of the conjugate plane in the case of the conventional arrangement shown in FIGS. 2 and 3.

Referring to FIG. 11, which shows equivalent light beams in the position around the conjugate planes d and e, the relationship between the level of the focus error signal and the light beam reflected by the reflecting surface at various positions in the case of the conventional arrangement will be explained once more. As shown by the broken line of FIG. 11, the diameter D$_Y$ of the light beam is equal to 0 (zero) when the reflecting surface is at the position a. Therefore, the light beam at the receiving surface 8a of the photo detector has a linear cross section, and only two (8a$_2$ and 8a$_4$) of the segments of the photo detector receive a great part of the incident light beam, and consequently the focus error signal has a negative peak at this position of the reflecting surface. Similarly, as shown by the partly dashed line of FIG. 11, the diameter D$_X$ of the light beam is equal to zero when the reflecting surface is at the position c. In this position of the reflecting surface, the focus error signal has a positive peak. However, due to the difference between the distances of the conjugate planes from the in-focus positions 1x and 1y, the focus error signal will be asymmetric with respect to each direction from the in-focus position. Furthermore, since there is the relationship between the diameters x and y of the light beam at the receiving surface and the diameters of the light beam at the reflecting surface: x=m$_X$·D$_X$, y=m$_Y$·D$_Y$, and m$_X$ and m$_Y$ are different from each other, there can be a positon of the reflecting surface away from the in-focus position in which the value of the ratio between the diameters R=D$_X$/D$_Y$ becomes equal to the value at the in-focus position. In such a position, the diameters x and y at the receiving surface become equal to each other and therefore the polarity of the focus error signal changes. Thus, the conventional arrangement of the focus error detection device had disadvantages which deteriorate the stability of the focus servo system, and there was a possibility that the object lens is driven in the false direction due to the production of a false focus error signal.

Figure 12A:
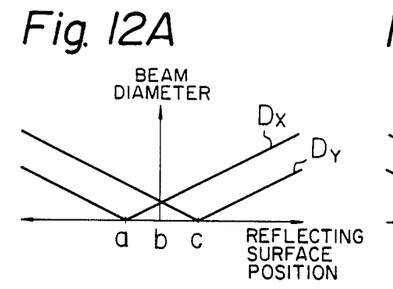
FIGS. 12A to 12C are diagrams respectively showing the variation of the diameters of the light beams $D_X$, $D_Y$ at the conjugate planes, the diameters x and y of the light beams in each direction of the receiving surface, and the magnitude of the focus error signal with respect to the displacement of the reflecting surface.
Figure 12B:
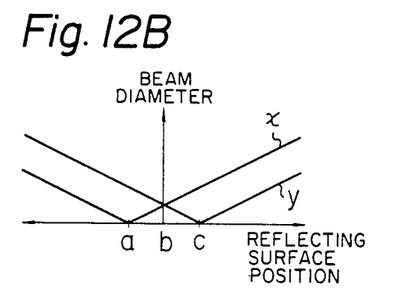
Figure 12C:
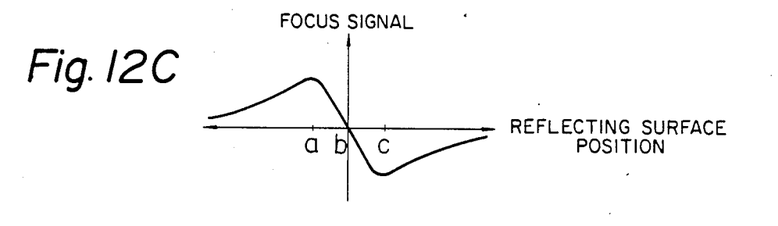

On the other hand, in the case of the focus error detection device according to the present invention, it is possible to obtain a symmetrical focus error signal. FIGS. 12A through 12C show the relationship between the diameters of the light beams at the reflecting surface and at the receiving surface, and the level of the focus error signal in the case of the device according to the present invention. As shown in FIG. 12A, the diameters D$_X$ and D$_Y$ of the light beam at conjugate planes will be equal to each other at the in-focus position b, and the distance between the position a and the position b and the distance between the position c and the position b are equal to each other since the lateral magnifications m$_X$ and m$_Y$ in different directions are equal to each other (m$_X$=m$_Y$). Further, the variation of the diameters x and y of the light beam at the receiving surface of the photo detector, which is shown in FIG. 12B, is like the variation of the diameters D$_X$ and D$_Y$ as shown in FIG. 12A. Therefore, the focus error signal has peaks at the positions a and c of the reflecting surface, and the shape of the varying curve is symmetrical with respect to the in-focus position b as shown in FIG. 12C. Further, there is no other position in which the polarity of the focus error signal turns over, which was present in the conventional device.

By this feature, the servo device will have a uniform servo gain around the in-focus position and, further, the capture range, which is the range of the displacement of the reflecting surface in which the servo system can lock in, can be extended as compared with the conventional arrangement.

Furthermore, since the spherical lens which is used in the conventional arrangement is replaced with a second cylindrical lens, axial alignment is only needed in a single axis. In addition, the cylindrical lenses are easily combined since it is not necessary to adjust the central positions thereof. This means that the number of optical parts in the device can be reduced, and the production process and maintenance is considerably simplified, as compared with the conventional arrangement.

It should be understood that the foregoing description is for illustrative purpose only, and is not intended to limit the scope of the invention. Father, there are numerous equivalents to the preferred embodiment, and such are intended to be covered by the appended claims.

As an example, the device can be applied to various optical paths in which the reflected light beam is in a diverging form, in a converging form or in a parallel form. Furthermore, the application of the device is not limited to a video disc player or a digital audio disc player, and the device can be utilized in various optical systems, for example systems using a non-disc type recording medium.

What is claimed is:

1. A focus error detection device for use with a system for recording and reading out information, the system having an optical system including a source of light and an optical path for leading a light beam from the source of light onto a recording surface of a recording medium through an objective lens, said device comprising:

a beam splitter disposed in said optical path between the source of light and the recording surface of the recording medium, for directing light reflected by the recording surface into a position for detection;

a photo detector for receiving the light from said beam splitter and for generating an output signal to be used for producing a focus error signal; and first and second uniaxial lenses disposed between said beam splitter and said photo detector, said uniaxial lenses having axial directions which are substantially perpendicular to each other, and disposed so that a photo receiving surface of said photo detector is located between focal lines of said first and second uniaxial lenses, wherein said first and second uniaxial lenses are positioned and the focal lengths of said objective lens and of said first and second uniaxial lenses are determined that a distance between a focal plane of said optical system and a conjugate plane of said photo receiving surface defined by said first uniaxial lens is equal to a distance between said focal plane and a conjugate plane of said photo receiving surface defined by said second uniaxial lens, and that lateral magnifications between said conjugate planes and said photo receiving surface in a plane perpendicular to the axis of said first uniaxial lens and the axis of said optical path and in a plane perpendicular to the axis of said second uniaxial lens and the axis of said optical path are equal to each other.

2. A device as set forth in claim 1, wherein said first and second uniaxial lenses are combined together.

3. A device as set forth in claim 1, wherein said first and second uniaxial lenses are disposed in a manner that said axial directions thereof are inclined to a direction of an image of a recording track of said recording medium substantially by an angle of 45°.

* * * * *